United States Patent

[11] 3,541,973

[72] Inventor Conradus Hubertus Aquarius
  13 Kanaalstraat, Weert, Netherlands
[21] Appl. No. 700,218
[22] Filed Jan. 24, 1968
[45] Patented Nov. 24, 1970
[32] Priority Feb. 13, 1967
[33] Netherlands
[31] No. 670,2160

[54] APPARATUS FOR MOULDING LOLLIPOPS FROM A STRING OF SUGAR, WITH LOLLIPOP STICKS TO BE LOCATED SIMULTANEOUSLY
  8 Claims, 1 Drawing Fig.
[52] U.S. Cl. .................................................. 107/8
[51] Int. Cl. .................................................. A23g 3/12
[50] Field of Search .......................................... 107/8, 8.1

[56] References Cited
UNITED STATES PATENTS
| 1,487,788 | 3/1924 | Lombardo et al. | 107/8.1 |
| 1,958,380 | 5/1934 | Boettger et al. | 107/8.1 |

FOREIGN PATENTS
| 1,349,269 | 12/1963 | France | 107/8.1 |

Primary Examiner—Fred C. Mattern, Jr.
Assistant Examiner—Robert L. Smith
Attorney—Nolte & Nolte ABSTRACT: An apparatus for moulding lollipops from a sugar string, with simultaneously located lollipop sticks, in which the lollipops are formed by compressing severed string-pieces between two reciprocating moulding dies which are located at both sides of each piece of sugar string, and the sticks are axially inserted (in the direction of movement of the dies) into said piece, through an axial insert opening which is provided in one of the two dies.

Patented Nov. 24, 1970
3,541,973
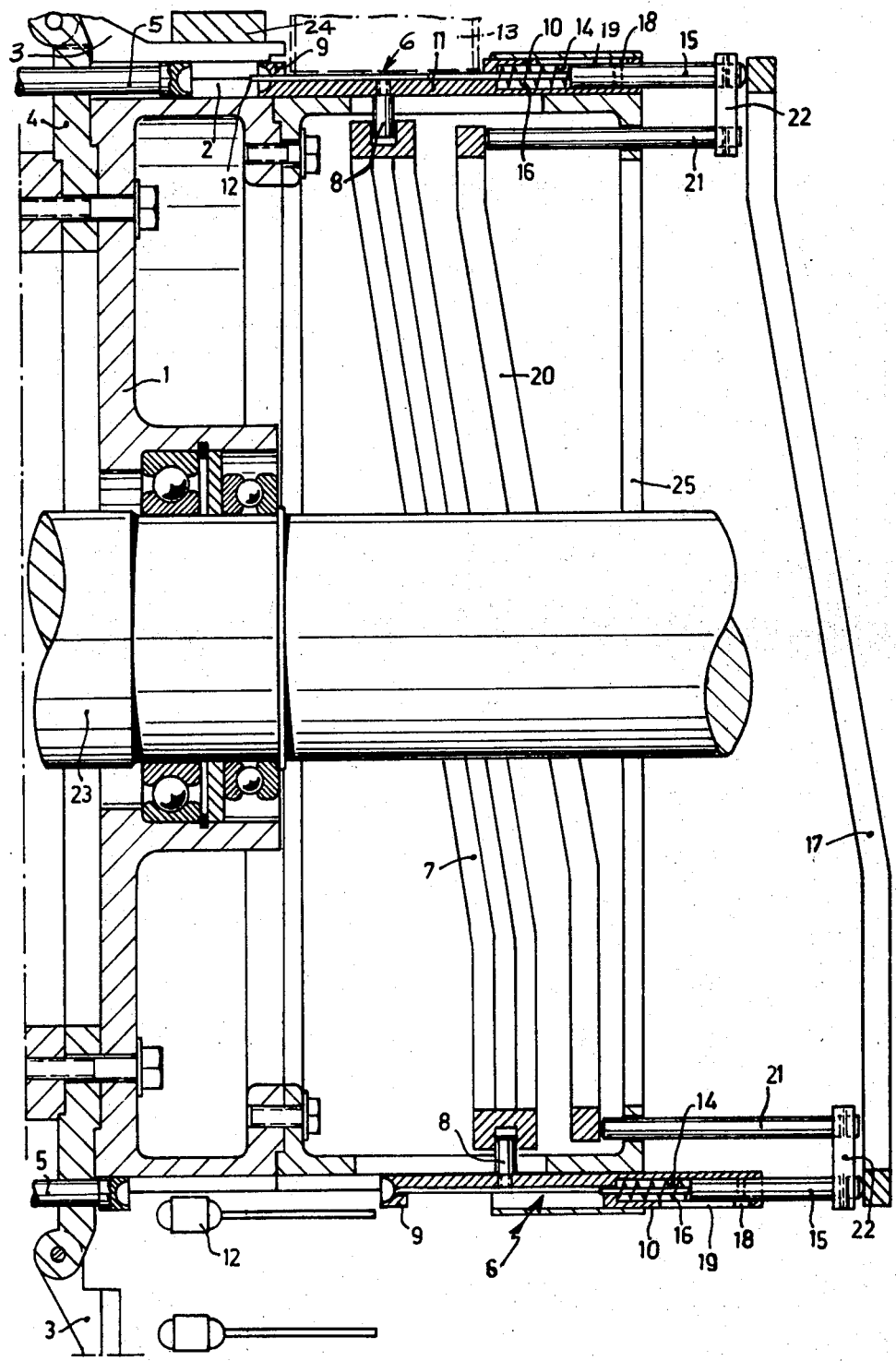
INVENTOR:
CONRARDUS HUBERTUS AQUARIUS
BY: Nolte & Nolte
ATTORNEYS 3,541,973

APPARATUS FOR MOULDING LOLLIPOPS FROM A STRING OF SUGAR, WITH LOLLIPOP STICKS TO BE LOCATED SIMULTANEOUSLY

A known apparatus (U.S. Pat. No. 1,958,380) is provided with a rotatable moulding drum with a series of recesses around its periphery which recesses together with flaps which are pivotally attached to the periphery of the drum and in closed position cover two adjacent halves of two adjacent recesses and together with two series of moulding dies which are located at both sides of the recesses and are movable to and fro in parallel with the drum axis, delimit moulding cavities for the lollipops and furthermore said apparatus being provided with means for inserting lollipop sticks into the closed moulding cavities. The latter means in the known apparatus are arranged to insert radially the lollipop sticks into the mould cavities in a direction which is perpendicular to the relative direction of movement of the moulding dies in respect of the drum. For that purpose an insert opening is formed in adjacent longitudinal edges of the upper face of each of two adjacent flaps.

As a result of the location of the said inserting means at the outer periphery of the drum, the known apparatus has a considerable height. Moreover disturbances occur as a result of the fact that the lollipop sticks move according to a straight radial path, whereas the pivoting flaps, and, consequently, also the insert openings present therein pass through a circular path when opening and closing of the flaps.

It is an object of the invention to provide an apparatus for moulding lollipops which apparatus, like the apparatus according to the said U.S. Pat., is provided with two series of movable moulding dies and with means for inserting lollipop sticks, but has not the drawbacks which are inherent to a radial insertion of lollipop sticks.

In order to realize the purpose aimed at, the invention, in the first place, relates to a method for moulding lollipops from a string of sugar, with lollipop sticks to be located simultaneously according to which method lumps are successively severed from the string of sugar in moulding cavities, each severed piece of string is moulded in a closed moulding cavity by subjecting it to the pressure of two moulding dies which can be moved to and fro and are located at both sides of the piece of string and a lollipop stick is inserted into each piece of string while said piece is in the closed moulding cavity between the two moulding dies, the said stick being inserted through an insert opening which is present in one of the two moulding dies, and in the direction of movement of the moulding dies.

The invention also comprises an apparatus when used in carrying out the method according to the invention, which apparatus, like that according to the cited U.S. patent, is provided with a rotatable moulding drum with a series of recesses around its periphery which recesses together with flaps, which are pivotally attached to the periphery of the drum and in closed position cover two adjacent halves of two adjacent recesses and together with series of moulding dies which are located at both sides of the recesses and can be moved to and fro in parallel with the axis of the drum, delimit moulding cavities for the lollipops, and the apparatus furthermore is provided with means for inserting lollipop sticks into the closed moulding cavities through an insert opening, and is mainly distinguished from the known apparatus in that the insert openings for the lollipop sticks are provided in one series of moulding dies and in a direction parallel to the axis of the drum such that the said insert means press the lollipop sticks axially through the moulding dies of the said one series into the closed moulding cavities and, consequently, into the pieces of string present therein.

The invention also comprises lollipops with simultaneously located lollipop sticks moulded with application of the method according to the invention. These lollipops are distinguished by a very smooth form, without moulding burrs on their surfaces. Because the insert openings are formed in the moulding dies and can be located completely in the center one is sure that the lollipop stick is inserted exactly in the middle of the ball of sugar of the lollipop.

For the sake of completeness it is pointed out that in apparatus for moulding lollipops it is known per se to insert lollipop sticks into moulding cavities for lollipops in a direction which is parallel to the center line of the moulding drum. An example of such an apparatus is disclosed in Netherlands Pat. specification 91,633. Here, however, an apparatus is concerned with only one single series of movable moulding dies which is at the other side of the moulding cavities than the insert openings for the lollipop sticks, which insert openings, in this case, each are recesses partially; in a stationary end wall of the moulding cavities and partially in the adjacent corners of two pivotal flaps cooperating with said moulding cavity. Consequently, this known apparatus is not based on the idea to insert lollipop sticks axially into the moulding cavities (*i.e.* in a direction parallel to the drum axis) in case that the apparatus is provided with two series of movable moulding dies which are at both sides of the moulding cavities.

The method and apparatus according to the invention are not limited to the manufacture of lollipops of one certain shape. Various shapes of lollipops are possible, *e.g.* flat, ball shaped, longitudinal ones, etc.

With reference to the drawing which represents a preferred embodiment of the apparatus according to the invention diagrammatically and in section, the apparatus and the action thereof are further elucidated.

The apparatus has a rotating externally driven drum 1. The latter has recesses 2 and pivotal flaps 3 at its periphery. Said flaps are pivotally connected at the periphery of a ring 4 which forms a part of the moulding drum 1. Also the flaps 3 are provided with cavities which complete the recesses 2 at the periphery of the drum to the profile of the lollipops. Two series of moulding dies 5 and 6 are located in parallel with the axis of rotation of the moulding drum. These two series are located at both sides of the slot-shaped recesses 2. Each series has an own mechanism of movement which will be elucidated herebelow. These mechanisms of movement control the moulding dies 5 and 6, respectively in such a way that two moulding dies, one from each end, are movable to and fro in each recess, in the direction of the center line of the moulding drum.

At its end face lying in the moulding cavity each moulding die is provided with a semispherical recess in accordance with the shape which is to be given to the end faces of the lollipops. The latter recess, may if desired, also have another shape.

The reciprocating movements of the series of dies 5 and 6 are controlled with guide curves. The guide curve for the dies 5 is not represented, but is not distinguished in an inventive manner from what is known in this domain. The guide curve for the series of dies 6 is indicated by 7. Each die 6, in fact, is formed from an oblong cylindrical body, with at the one end the short cylindrical portion 9 and at its other end the longer cylindrical sleeve-shaped portion 10. Between the portions 9 and 10 the portion 11 is located having a substantially semicircular cross section and having its outward surface extending substantially in the longitudinal center face of the die 6. The length of this portion 11 is greater than the length of a lollipop stick 12. Through the longitudinal center of the die 6 a bore extends which, in the portion 11, is open at the top and semicircular in cross section. In fact, the bore in the portion 11 is a longitudinal slot which is open at the top. Herein at each cycle a lollipop stick drops from the container 13. There where the portion 11 passes into the sleeve-shaped portion 10 the bore is considerably widened. This widened portion of the bore is indicated by 14. In this bore a pin 15 can be moved to and fro. The pin has a thick portion and a thin portion. The thick portion can be moved substantially without clearance in the sleeve 10. The thin portion which is at the front of the pin 15 has a diameter which substantially corresponds to that of the bore in the portion 9 or the slot in the portion 11. In the widened portion 14 of the bore a compression spring 16 is located between the thick portion of the pin 15 and the wall which separates the bore 14 from the portion 11. The pin 15 has the purpose to press a lollipop stick 12 inwards into the moulding cavity which in case of closed flaps, 3 is limited by the flaps two dies 5 and 6 and the peripheral wall of the moulding drum 1. By way of the curve 17 the pins 15 are displaced in inward direction against the action of the spring 16. The path of movement of the pin 15 in respect of the sleeve 10 is limited by a cam 18 extending from the pin, e.g. a screw which is guided in a longitudinal slot located in the wall of the sleeve 10. The return movement of the pins 15 is controlled by the curve 20 which cooperates with the pin 15 by means of a pin 21 and a connecting strip 22. This return movement of the pin 15 is aided by the spring 16. The application of the curve 20, however, assures that in case of breaking of the spring 16 the pin 15 is returned to its outermost position. Consequently, the spring 16 is not absolutely necessary for a good action.

The moulding drum 1 bears rotatably on the stationary main shaft 23. The pressure cam for the pivoting flaps 3 is indicated by 24.

Each moulding die 6 is shifted from the outside into a bore which is located near the outer periphery of the cylindrical body 25. This body 25 forms a unit with the drum 1 and, consequently, participates in its rotating movement.

After the above description of the constructive embodiment of the apparatus a short summary of the action will follow.

The string of sugar (not represented) is supplied to the recesses 2. The flaps 3 close gradually and sever pieces from the string. If the flaps are closed and a severed piece of the sugar string is in the moulding cavity which is limited by the flaps 3, the moulding dies 5 and 6 and the outer periphery of the drum 1, a lollipop stick 12 is pressed inwards by the pin 15 through the longitudinal bore which is present in the portion 9 of the die 6. This pressing movement is effected in the direction parallel to the center line of the main shaft 23. After the stick 12 has been inserted through the said bore and into the closed moulding cavity and, consequently, into the mass of sugar present therein, the pressing action onto this mass of sugar can start. The lollipop sticks 12 drop from the container 13 into the longitudinal slot which is open at the top between the portions 9 and 10 of the dies 6. When the lollipop stick has been inserted into the sugar mass and the pressing action has been ended, the moulded lollipop can be removed from the moulding cavity. For that purpose the moulding dies 5 and 6 are again separated from each other by way of their control curves, particularly the dies 6 being withdrawn so quickly and so far beyond the free end of the lollipop sticks that they release these sticks completely. Also the moulding dies 5 are moved backwards so far that they completely release the finished lollipops. Since the various operations and treatments take place during rotation of the moulding drum 1, a suitable adjustment of the various operating curves can result in that the dies 5 and 6 release the finished lollipops at the moment that they are at the bottom of the moulding drum 1. Since at the bottom of the drum 1 the pivoting flaps 3 swing open downwards, the finished lollipops released by the dies 5 and 6 can drop freely downwards owing to their own weight.

Preferably the movements of the dies 6 and the pins 5 are adjusted in respect of each other in such a way that immediately before the release of the finished lollipop the pin 15 is displaced over a slight forward distance in respect of the pertaining die 6 before the pin 15 and die 6 are withdrawn to their initial positions. The advantage is that the pin 15 completely releases the lollipop from the curved pressure face of the die 6 (i.e. from the curved end face of the portion 9 of the die 6) all this in order to prevent the lollipop from adhering to said curved face.

The length of the thin portion of the pin 15 should be such that in the withdrawn position of the pin 15 the said thin portion is completely withdrawn from the longitudinal slot in the portion 11 in order that a lollipop stick can drop from the container 13 into said longitudinal slot. This position is represented at the bottom of the drawing.

It is obvious that the invention is not restricted to the embodiments described and represented but comprises all variants thereof which are comprised by the rights claimed.

I claim:

1. An apparatus for moulding lollipops from a string of sugar, with lollipop sticks to be located simultaneously, comprising a rotatable moulding drum with a series of recesses around its periphery which recesses together with flaps, which are pivotally attached to the periphery of the drum and in closed position cover adjacent recesses and together with two series of moulding dies which are located at both sides of the recesses and are movable to and fro in parallel with the axis of the drum delimit moulding cavities for the lollipops, and furthermore comprising means for the insertion of lollipop sticks into the closed moulding cavities through insert openings said means for the insertion of the lollipop sticks is provided in one series of movable moulding dies and in a direction parallel to the axis of the drum to press the lollipop sticks axially through the moulding dies of said series into the closed moulding dies and consequently, into the pieces of string present therein.

2. An apparatus according to claim 1, characterized in that each insert opening is located centrally in respect of the moulding die in which it is made.

3. An apparatus according to claim 1, characterized in that the means for the insertion of a lollipop stick for each moulding cavity consist of a guided pin which can be moved axially to and fro in a longitudinally bore in the moulding die in which the insert opening for the lollipop stick is provided which bore locally is carried out as an insert slot open to the top for receiving a lollipop stick, which receiving slot has a greater length than the lollipop stick.

4. An apparatus according to claim 3, characterized in that the pin is provided with a thick portion which is guided into a widened portion of the bore in the moulding die, and a thin portion which is guided into the said insert slot for the lollipop stick, all this in such a way that in case of a forward movement of the pin it presses the lollipop stick forwards in the insert slot and inwards into the moulding cavity through the said insert opening.

5. An apparatus according to claim 4, characterized in that a spring is located in the widened portion of the bore in the moulding die which spring exerts a pressing force on the pin.

6. An apparatus for moulding lollipops from a string of sugar, in which lollipop sticks are located simultaneously, comprising a rotatable moulding drum with a series of recesses around its periphery which recesses together with flaps, which are pivotally attached to the periphery of the drum and in closed position cover two adjacent halves of two adjacent recesses and together with two series of moulding dies which are located on opposite sides of the recesses and can be reciprocated in a direction parallel with the axis of the drum to form undivided end walls in each recess, delimit moulding cavities for the lollipops, and furthermore comprising means for the insertion of lollipop sticks into the closed moulding cavities through insert openings, each opening for the insertion of lollipop sticks further comprises a longitudinal bore, said openings being provided in one series of movable moulding dies and in a direction parallel to the reciprocating movement of the dies, each longitudinal bore passing into a longitudinal guide for a lollipop stick to be inserted into the bore, and an axially reciprocating pin for pressing the stick forwards in the bore and into the moulding cavity through the said insert opening, said guides being provided in the said moulding dies.

7. An apparatus according to claim 6 further comprising a flattened portion on each of said one series of reciprocating moulding dies, said guide having an open slot in said flattened portion said slot having a greater length than the lollipop stick and having its rear end connected with a guide bore for guiding the pin, said guide bores being provided in an end portion of the reciprocating moulding dies.

8. An apparatus according to claim 7 wherein said guide bore communicates with an axially arranged widened guide portion, said pin having a thin front part passing through said guide bore, a thick rear part guided in said widened guide portion, and a bias spring disposed in said widened guide portion for urging said pin into a limit position thereof.